A. J. COLWELL.
MACHINE FOR MAKING CIGARS.
APPLICATION FILED AUG. 12, 1914.

1,175,125.

Patented Mar. 14, 1916.

Witnesses.
Albert G. Puzgentkowski
Alice M. McCann.

Inventor
Allen J. Colwell
By Horatio E. Bellows
Attorney.

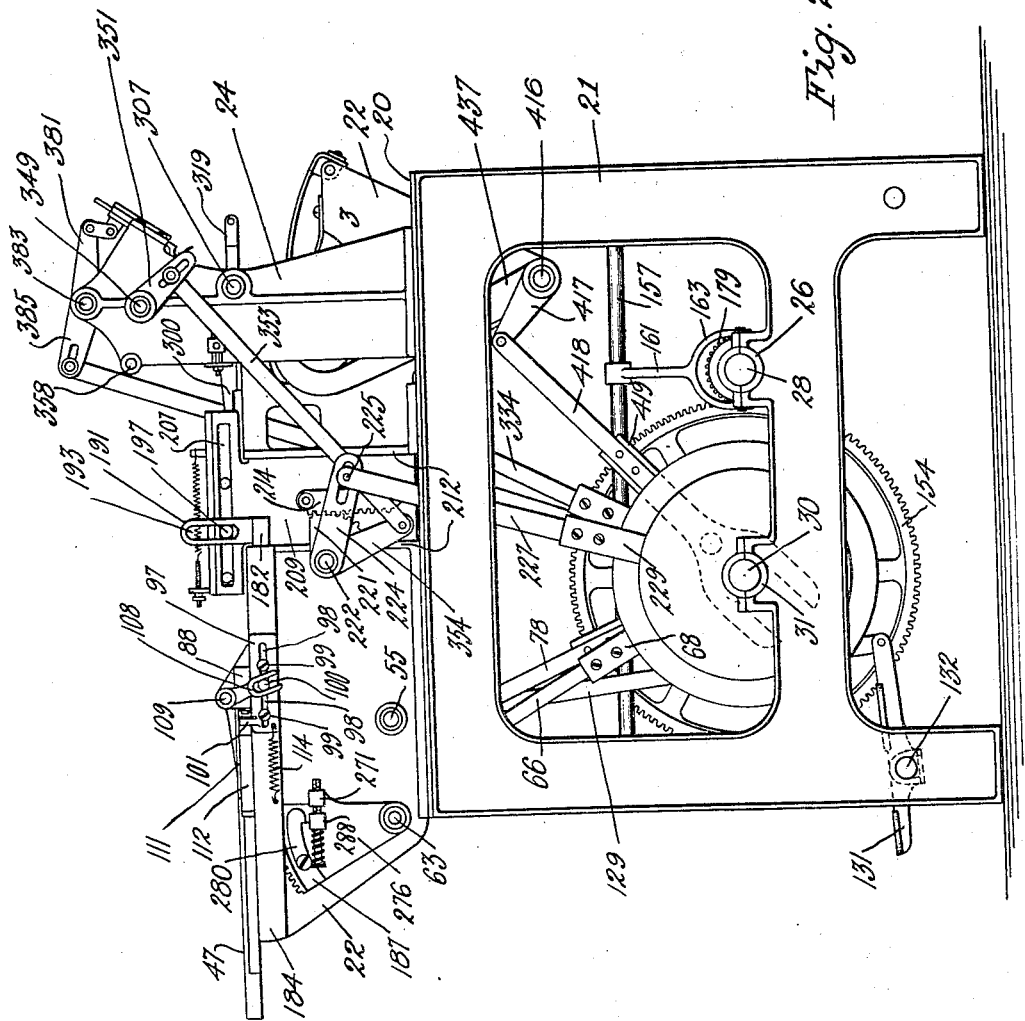

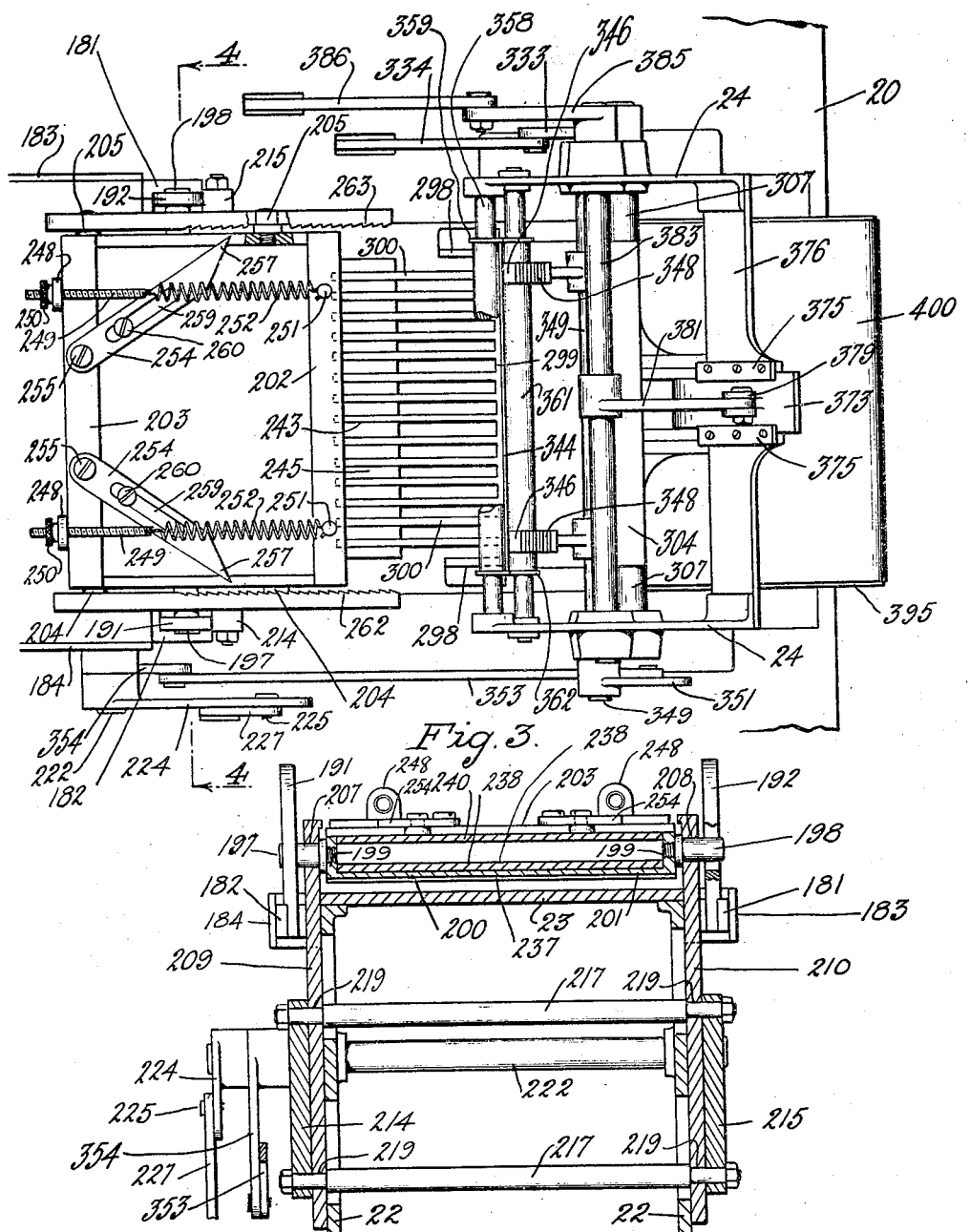

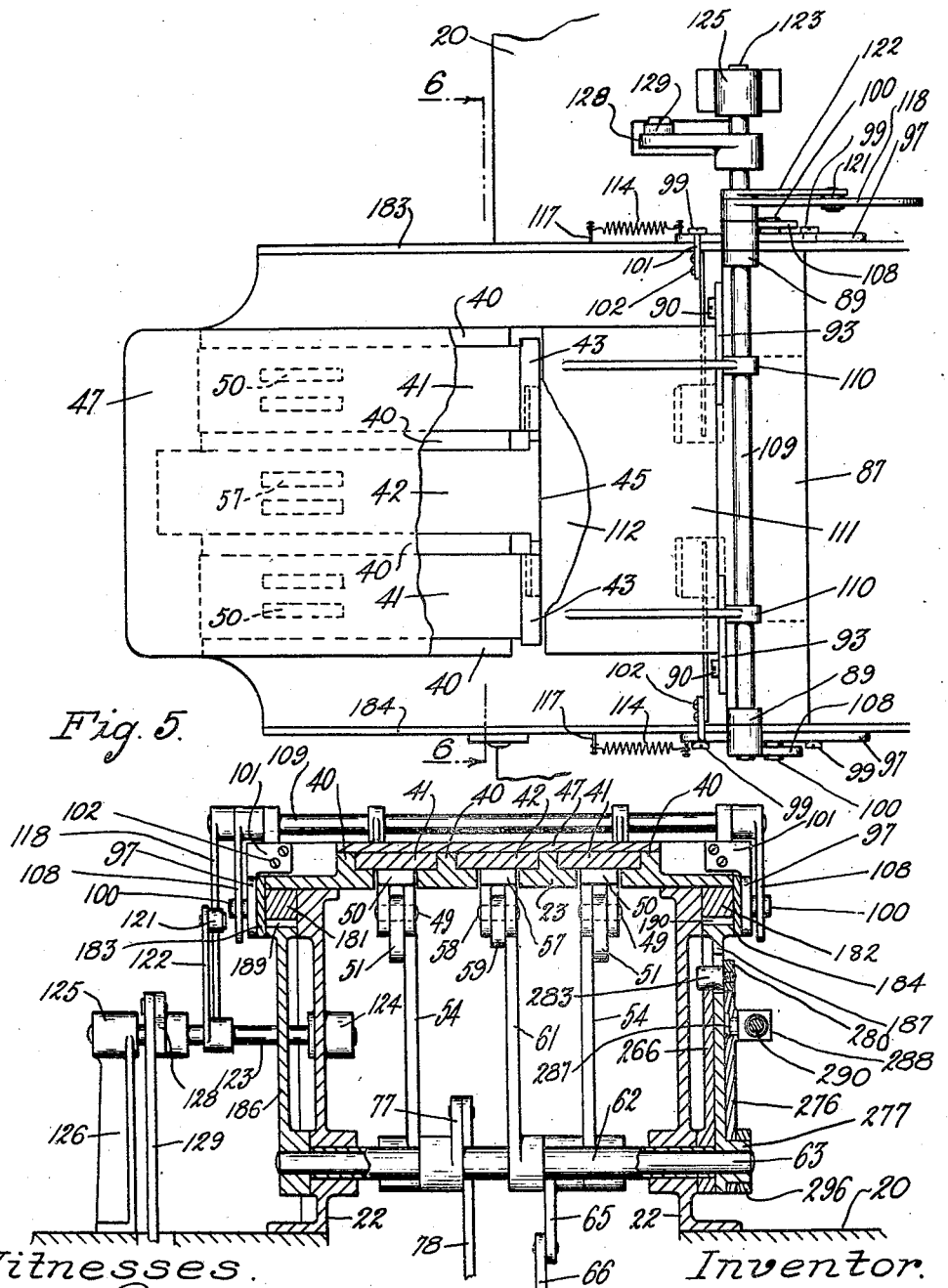

A. J. COLWELL.
MACHINE FOR MAKING CIGARS.
APPLICATION FILED AUG. 12, 1914.

1,175,125.

Patented Mar. 14, 1916.
9 SHEETS—SHEET 5.

Witnesses.

Inventor
Allen J. Colwell
By Horatio E. Bellows
Attorney.

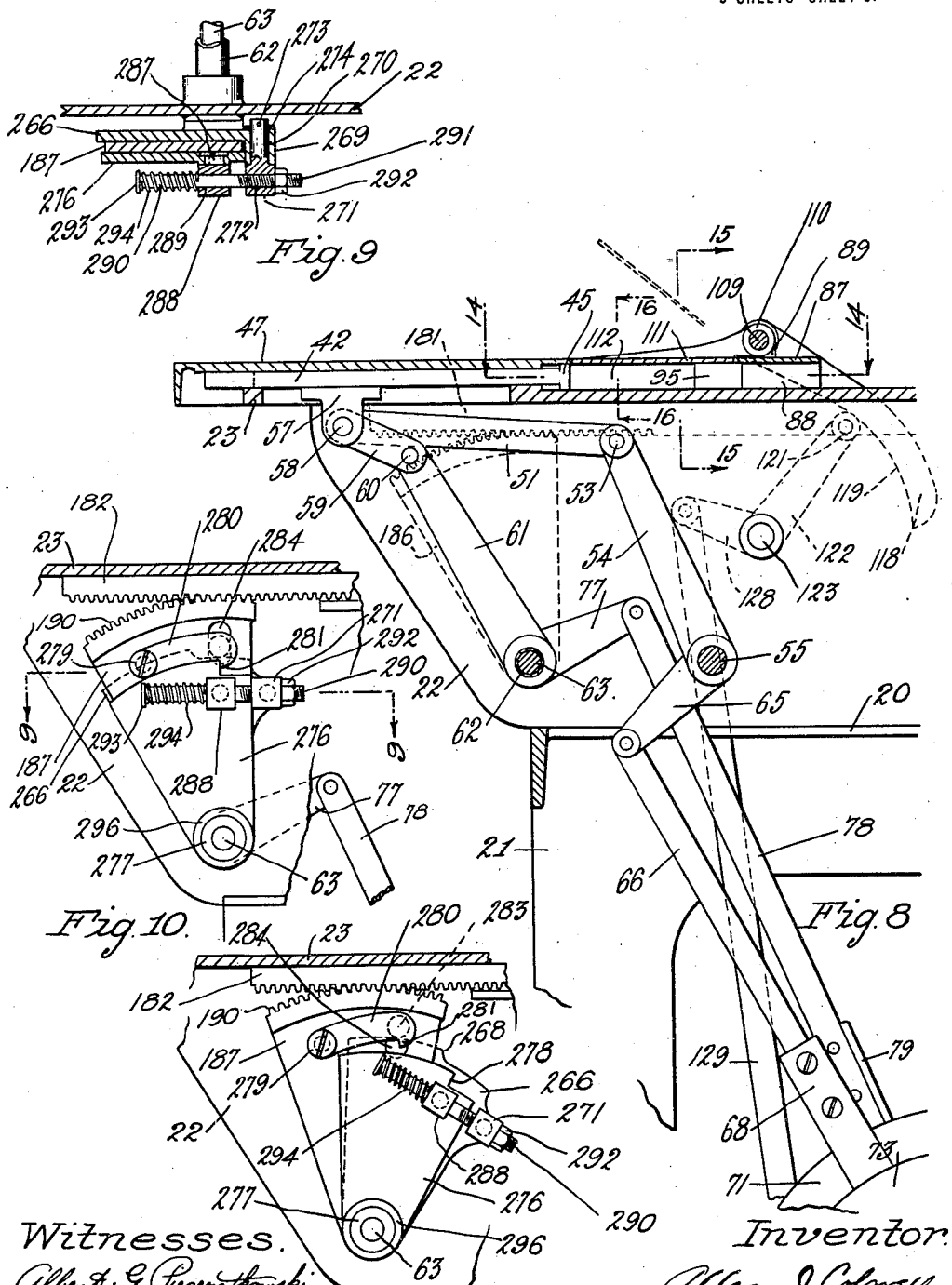

A. J. COLWELL.
MACHINE FOR MAKING CIGARS.
APPLICATION FILED AUG. 12, 1914.

1,175,125.  Patented Mar. 14, 1916.
9 SHEETS—SHEET 7.

Witnesses  
Albert G. Puczynkowski  
Alice M. McCann

Inventor.  
Allen J. Colwell  
By Horatio E. Bellows  
Attorney.

A. J. COLWELL.
MACHINE FOR MAKING CIGARS.
APPLICATION FILED AUG. 12, 1914.
1,175,125.
Patented Mar. 14, 1916.
9 SHEETS—SHEET 8.
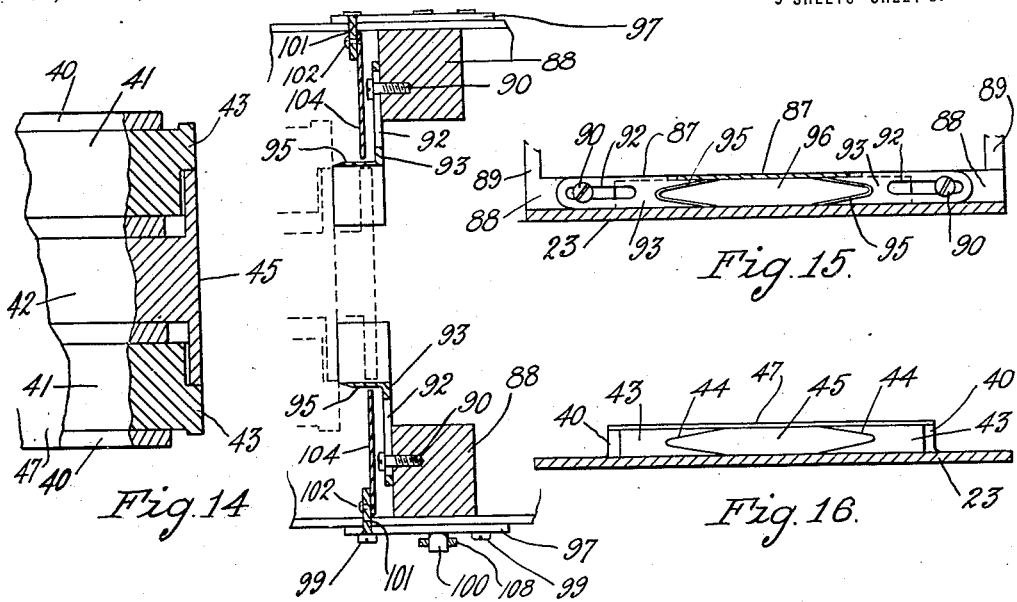
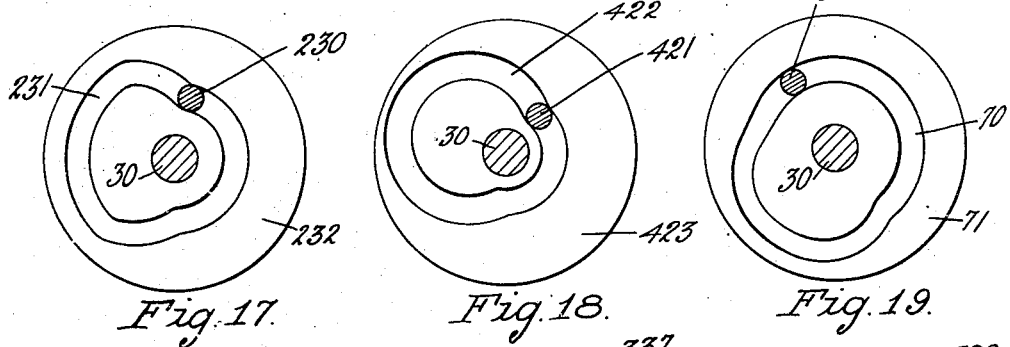
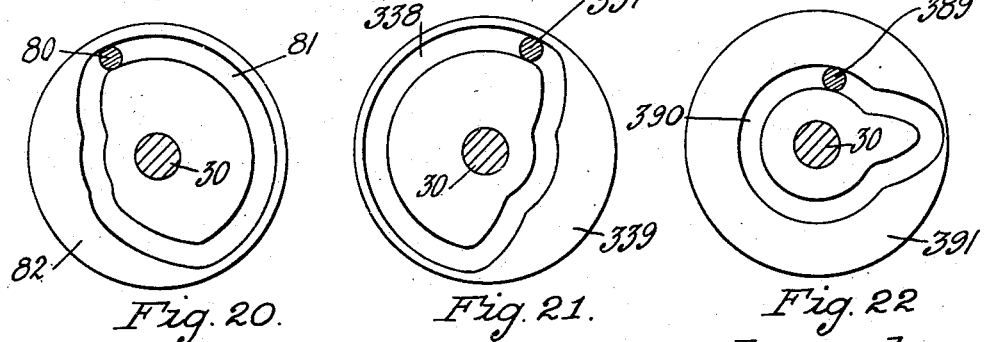
Witnesses.
Albert G. Piegenthowski
Alice M. McCann.
Inventor.
Allen J. Colwell
By Horatio E. Bellows
Attorney.

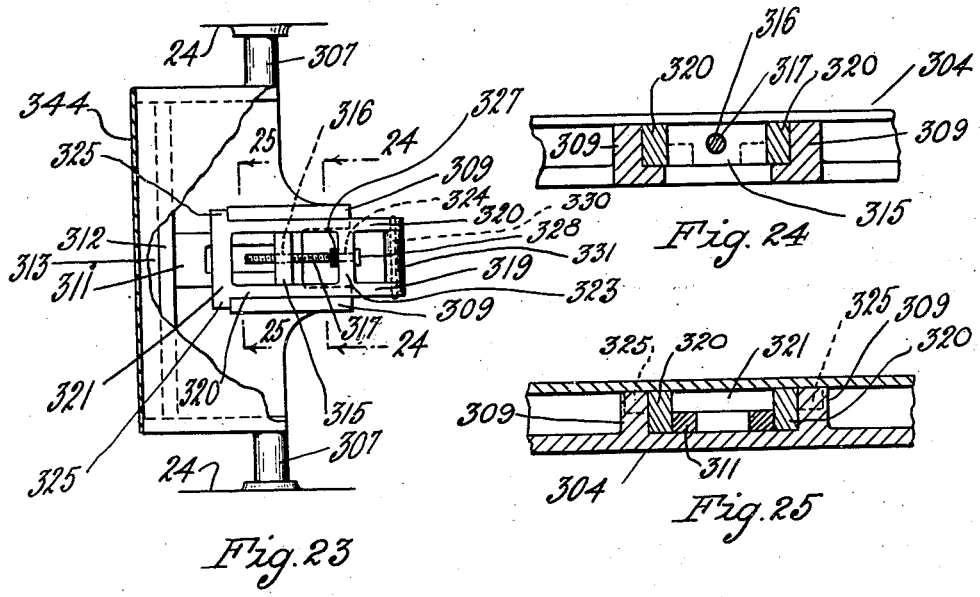
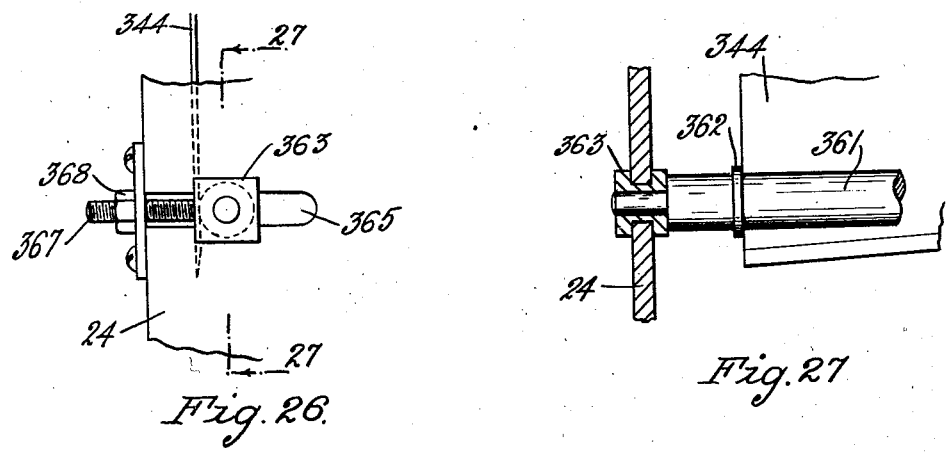

UNITED STATES PATENT OFFICE.

ALLEN J. COLWELL, OF PROVIDENCE, RHODE ISLAND, ASSIGNOR TO COLWELL CIGAR MACHINE COMPANY, INCORPORATED, A CORPORATION OF DELAWARE.

MACHINE FOR MAKING CIGARS.

1,175,125.  Specification of Letters Patent.  Patented Mar. 14, 1916.

Application filed August 12, 1914. Serial No. 856,324.

*To all whom it may concern:*

Be it known that I, ALLEN J. COLWELL, a citizen of the United States, residing at Providence, in the county of Providence and State of Rhode Island, have invented certain new and useful Improvements in Machines for Making Cigars, of which the following is a specification.

My invention relates to bunching machines and has for its essential objects the combination in a single structure of means for trimming the filler, forming and sizing the bunch, and binding the same; to effect these ends by mechanism that will insure prevention of waste, uniformity of size, and regularity of density of the resultant bunch; to insure speed in operation, and therefore in production, and provide improved means for controlling the slack in the binding apron and for discharging the bunch; and to provide means for trimming the filler strips which shall insure a more effective severance of the parts of the strips to be removed.

To the above ends essentially my invention consists in such parts and combinations of parts as fall within the scope of the appended claims.

Figure 1:
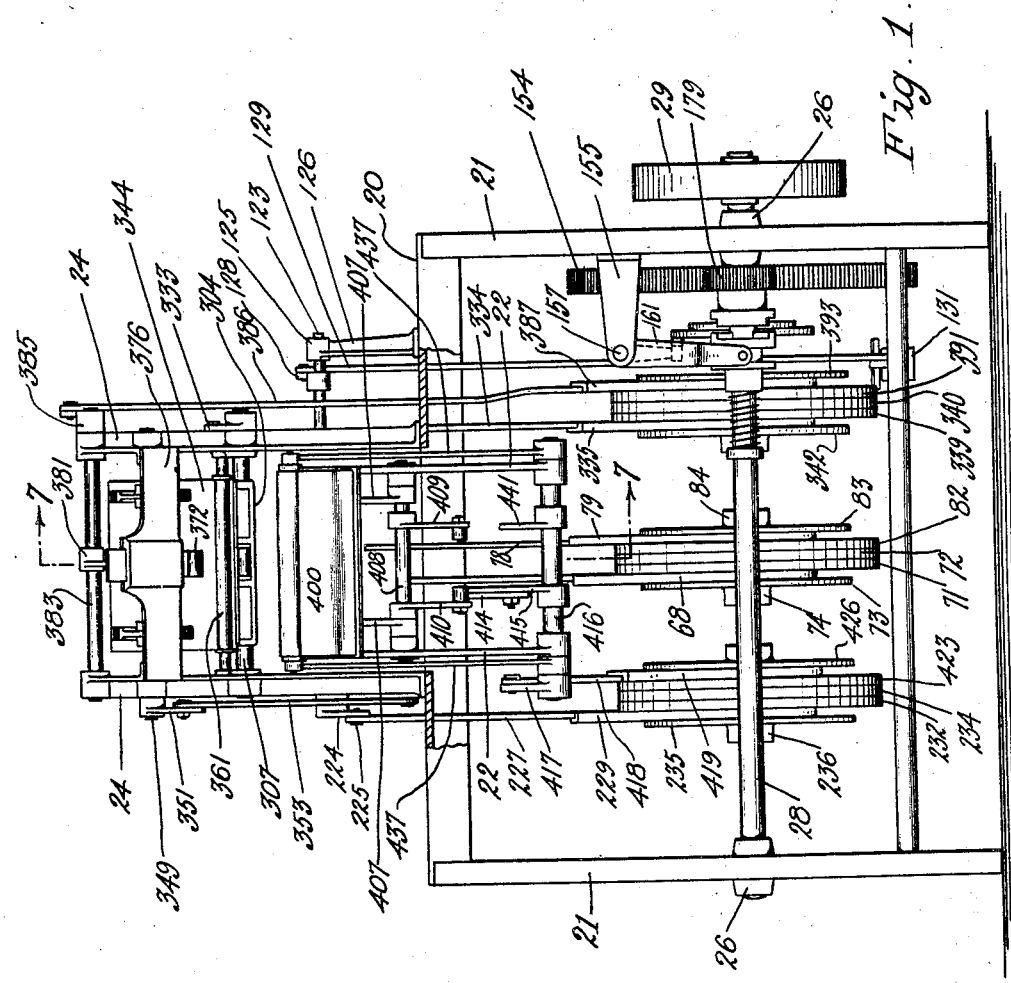
Figure 7:
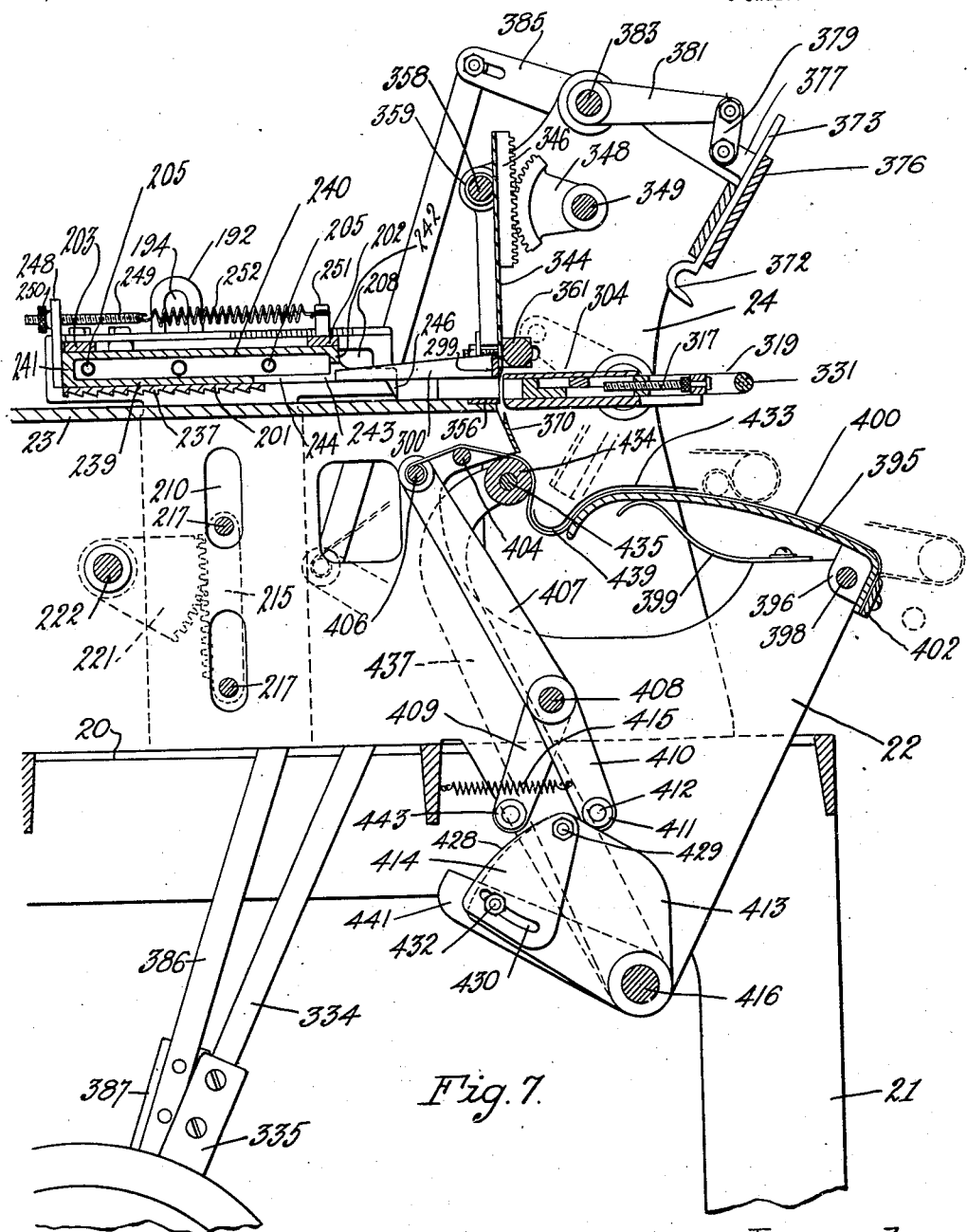
Figure 12:
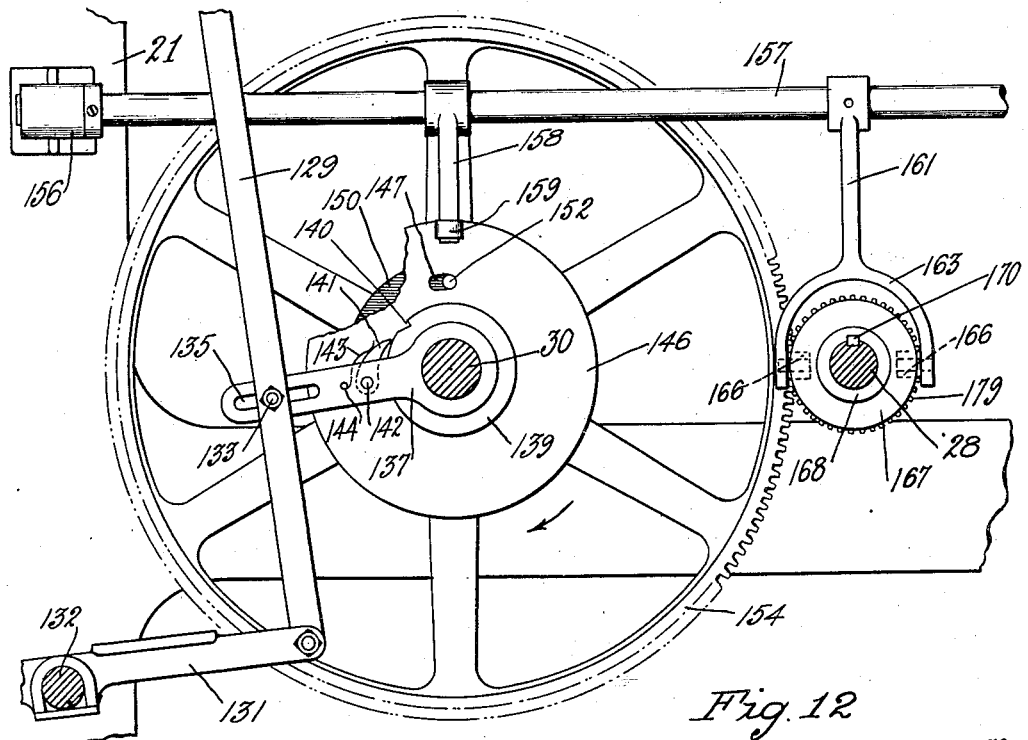
Figure 13:
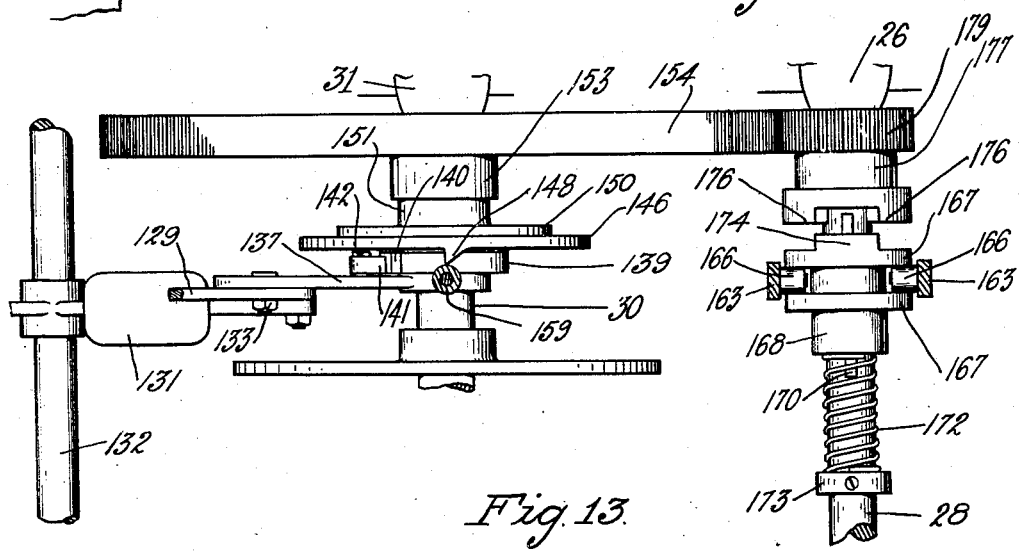

In the accompanying drawings which form a part of this specification, Figures 1 and 2 are front and side elevations respectively of a machine embodying my invention, Fig. 3, a plan view of the major portion of the same, Fig. 4, a section of the same on line 4, 4, of Fig. 3, Fig. 5, a plan view of that portion of the machine not shown in Fig. 3, Fig. 6, a section on line 6, 6, of Fig. 5, Fig. 7, a section of the major portion of the machine on line 7, 7, of Fig. 1, Fig. 8, a section on line 7, 7, of Fig. 1, of that portion of the machine not shown in Fig. 7, Fig. 9, a section on line 9, 9, of Fig. 10, Figs. 10 and 11, detail side elevations of the carriage actuating sector in positions of rest and advance respectively, Figs. 12 and 13, enlarged side elevation and plan view respectively of the starting and stopping mechanism, Figs. 14, 15, and 16, sections on lines 14, 14, 15, 15, and 16, 16 respectively of Fig. 8, Figs. 17 to 22 inclusive side elevations of the six main operating cams of the machine, Fig. 23, a plan view of the receiving box, Figs. 24 and 25 sections respectively on lines 24 and 25 of Fig. 23, Fig. 26, an enlarged detail of adjusting means for coöperation with the blade, and Fig. 27, a section on line 27 of Fig. 26.

Like reference characters indicate like parts throughout the views.

The frame work of my machine may be of any form of construction best adapted for carrying the necessary mechanical parts. In the present instance the frame comprises the floor 20, supporting portions 21 for the floor, side frames 22, supporting bed 23, and carrying the uprights 24.

In bearings 26 in the portions 21 of the frame is mounted the main shaft 28 of the machine, driven by pulley 29. In alinement with this shaft is a shaft 30 also mounted in bearings 31, and driven from shaft 28 through a clutch mechanism hereinafter described.

Slidably mounted upon the bed 23 at the rear end of the machine, between guides 40 are side plungers 41 and central plunger 42. The side plungers have integral with or fixed to their forward ends, facings 43 of leather, wood, or soft metal, with substantially V-shaped lateral recesses 44, and the plunger 42 has likewise an integral or attached substantially elliptical plate or facing 45. Fixed to the tops of the guides 40 over the plungers and extending rearwardly thereof some distance is a cover or casing 47.

The plungers are reciprocated along the bed thus. Pivoted to pins 49 in blocks 50 upon the side plungers 41 are links 51 pivoted to pins 53 in the upper ends of levers 54 fixed to a rock shaft 55 in the frame portions 22 below the bed 23. The central plunger 42 also has a block 57 to which is pivoted by a pin 58 a link 59 connected by a pin 60 to the end of a lever 61 fixed to a sleeve 62 loose on a rock shaft 63 mounted in the frame adjacent the shaft 55. Shaft 55 is driven through a lever 65 fixed thereto and to whose end is pivoted a connecting rod 66 having at its lower end a fork 68 embracing the cam shaft 30, and having upon its side a cam roller 69 which travels, as shown in Fig. 19, in a channel 70 in a cam plate 71 fixed on wheel 72 on the cam shaft. The fork is held in contact with the face of the cam by a disk 73 whose hub 74 is fixed to the cam shaft.

The sleeve 62 with which the central plunger is connected is rocked as follows. An arm 77 is fixed to the sleeve, and is pivoted to a rod 78 having a fork 79 upon its lower end embracing the cam shaft, and provided with a cam roll 80 which, as shown in Fig. 20, travels in a cam channel 81 in cam plate 82 upon the wheel 72, which fork is retained by a disk 83 whose hub 84 is fixed to the cam shaft. The central plunger 42 has a longer forward travel than the side plungers. They are so timed that all three plungers initially advance in unison together a short distance, and then the side plungers stop and the center plunger advances somewhat farther.

The plungers constitute a part of the cutting or trimming mechanism which includes as shown in Figs. 14 and 15 a transverse abutment forward of the plungers, provided with a bridge portion 87, and with integral end supporting portions or blocks 88 fixed to the face of the bed. Upon the ends of the blocks are vertical bearings 89. In the faces of the blocks toward the plungers are screws 90 passing through slots 92 in plates 93, whereby the plates are capable of longitudinal adjustment. Upon the inner ends of the plates are blades 95 disposed at right angles to the plane of the plates substantially V-shaped or semi-elliptical in cross-section, forming therebetween a space 96 of such dimensions as receive the portion 45 of the central plunger as a sliding fit. For stripping these blades and guarding the fingers of the operator the following mechanism is employed. Upon each side of the frame adjacent the knives are slidable plates 97 provided with longitudinal slots 98 to receive detaching screws 99 located in the frame. In the middle of the plates are studs 100, and near one end of each plate is a lug 101 to which is fixed by screws 102 or otherwise, or integral with which, is a resilient stripper plate 104 whose inner ends are shaped to slidably fit the outer sides of the blades 95.

The plates 97 are reciprocated through forks 108 fixed to the ends of a rock shaft 109 journaled in the bearings 89. Fixed to the shaft are the hinges 110 of a cover 111 which rests upon the blades and incloses the space 112 between the plungers and the abutment wherein the strips to be cut are initially placed. The plates 97 are rearwardly tensioned by springs 114 attached to the plates and to pins 117 in the frame. These springs normally hold the cover in open position, and advance the stripper members 104. The shaft 109 is rocked by the following mechanism. A curved arm 118 provided with a cam edge 119 is fixed to the shaft 109. Engaging the edge 119 is a cam roll 121 on a lever 122 fixed to a shaft 123 having a bearing 124 in the frame and a bearing 125 in a support standard 126 on the floor 20. Fast on the shaft 123 is an arm 128 to which is attached a connecting rod 129, to whose lower end is pivoted a foot lever 131 journaled on a tie rod 132 in the frame. As shown in Figs. 12 and 13 a pin 133 in an intermediate portion of the rod 129 engages in a longitudinal slot 135 in an arm 137 loosely mounted on a shaft 30. Adjacent the arm is loosely mounted on the shaft a disk 139 provided with a notch 140 adapted to receive a pawl 141 mounted on a pin 142 in the arm 137 inwardly pressed by a spring 143 also fixed to a pin 144 in the arm. Integral with or attached to the toothed disk is a larger disk 146 provided with an arcuate opening 147, and upon its margin a lateral cam tooth 148. Adjacent the last mentioned disk is a disk 150 whose hub 151 is fixed to the shaft 30. A pin 152 on this disk registers in the slot 147. Abutting against the hub 151 is the hub 153 of a gear 154 also fixed to the cam shaft 30. In brackets 155 and 156 upon the frame is a rock shaft 157 carrying an arm 158 having upon its end a cam roller 159 adapted to contact with the cam projection 148. The coöperation of the cam 148 and arm 158 controls a clutch mechanism as follows. An arm 161 is fixed to the shaft 157 having a fork 163 upon its outer end which carries studs 166 embraced by flanges 167 on a sleeve or clutch member 168 keyed as at 170 to the driving shaft 28. A spring 172 bearing against a collar 173 upon the shaft presses against one end of the sleeve. The opposite end of this sleeve has segments 174 adapted to engage between segments 176 in the clutch member 177 loose on the shaft. Fixed to the member 177 is a pinion 179 meshing with gear 154.

The operation of the described parts is as follows. The shaft 109 is rocked by the foot lever 131 through the rod 129, arm 128, shaft 123, and arm 122, whose roller 121, when the foot lever is depressed, travels toward the outer end of the cam arm 118 thereby closing the cover, withdrawing the plates 97, and maintaining the cover in closed position. When the rod 129 is upwardly impelled as described, the pawl 141 on the arm 137 engages in the notch 140 and advances the disk 146 a short distance in the direction of the arrow thereby forcing the cam projection 148 beyond the contacting roller 159, and permitting the latter to be forced down against the face of the disk 146 through the pressure of the spring 172 through the arm 161, shaft 157, and arm 158. The described release of the roller 159 permits the spring 172 to advance the clutch member 168 into engagement with the loose clutch member 177, thus driving the cam shaft 30 from the driving shaft 28 through the pinion 179 and gear 154. Therefore the plungers 41, 42 are set into operation, and are once reciprocated by virtue of the clutch mechanism. It will be observed that the cover 111 is first closed by the upward movement of the rod 129 during the advance of the pawl 141 to the notch 140, thus insuring that the tobacco beneath the cover is thoroughly held and the fingers of the operator protected prior to any operation of the machine. After the operator has manually placed a bunch of tobacco strips in the chamber 112 with the leaves or strips transversely disposed, and after the cover has been closed, the plungers are actuated from the cam shaft and cams through the described connections thus. The three plungers advance together until the portions 43 of the side plungers contact with the cutting edges of the blades 95, as shown in broken lines in Fig. 14. This contact either severs or partially severs the strips, and at this point the portion 45 of the central plunger 42 continues its advance through the opening 96 between the blades and beneath the bridge portion 87 of the abutment, which advance serves to finally tear or sever any of those strips which have not been perfectly cut by the blades. The return half of the reciprocation of the plungers brings them back to original position. During their return the cover is released by the forward depression of the foot lever, and the cover is raised and the strippers 104 are moved along the blades 95 by the action of the spring 114 whereby clogging is avoided, and the severed end portions of the strips are returned to be again utilized. The strips that are cut by the central plungers are advanced thereby along the bed, to be evened, and further advanced by the mechanism now to be described.

Two rack bars 181 and 182 are slidably mounted in caps 183 and 184 constituting a part of the frame at each side of the bed. Reciprocating these racks are segments 186 and 187 whose teeth 189 and 190 engage the rack bars 181 and 182 respectively. The segments are fixed to the ends of rock shaft 63. Fixed to the forward ends of the rack bars are plates 191 and 192 provided with vertical slots 193 and 194 respectively in which slots slide the outer ends of studs 197 and 198 fixed in the sides 199 of a frame 200 comprising a base 201 and provided with transversely disposed forward and rear strips 202 and 203 upon its top. At both sides of the studs 197 and 198 are respectively shorter guide studs 204 and 205 which also slide in horizontal slots 207 and 208 in the upper margins of plates 209 and 210 respectively vertically movable in guides 212 upon opposite sides of the frame. The vertical reciprocation of these plates is effected by means of racks 214 and 215 held tightly against plates 209 and 210 by means of tie rods 217 connecting their ends and passing through openings 219 in said plates. Each rack is engaged by a toothed segment 221 fixed on each end of a rock shaft 222, mounted in the frame, upon whose outer end is an arm 224 pivotally connected by a pin 225 to the upper end of a rod 227 upon whose lower end is a fork 229 embracing the shaft 30, and having on its side a stud 230 traveling in a cam channel 231 in the face of a cam plate 232 as shown in Fig. 17, which plate is fast to the body 234 fixed to the shaft. The fork is held in contact with the cam plate by a disk 235 whose hub 236 is fast on the shaft 30.

Upon the base 201 of the frame 200 are series of teeth 237 arranged in transverse rows extending from side to side of the base. Slidably mounted in this frame is a smaller frame 238 having open sides and provided with a base 239, a top 240, a back wall 241, and a front wall 242, provided with a horizontal series of slots 243, extending into the base as at 244. The portions of the base intermediate the slots are extended forming forwardly projecting integral fingers 245 provided upon their ends with downwardly extending prongs 246. Fixed to the rear wall 241 of the inner box are two upwardly directed lugs 248 provided with perforations through which loosely pass screws 249 upon which are adjusting nuts 250 bearing against the rear faces of the lugs. Upon the transverse strip 202 forming a portion of the upper part of the outer box are pins 251 to which are attached forward ends of helical springs 252, whose outer ends are attached to the inner ends of the screws 249. By this means the inner box is normally drawn forward relatively to the outer box, and the tension of the springs 252 is controlled by the nuts 250. Coöperating with this tensioning means is a locking means comprising two arms 254 pivotally connected at their rear ends to screws 255 in the top of strip 203, constituting a part of the outer box. These arms are provided on their free ends with points 257, and intermediate their length with longitudinal slots 259 through which pass screws 260 fixed in the top wall 240 of the inner box. These arms are inclined forwardly and outwardly from their pivotal point, and are adapted under certain circumstances to engage with horizontal series of rearwardly directed teeth 262 and 263 upon the plates 209 and 210 respectively. The path of travel of the frame 200, therefore, due to the reciprocating horizontally and vertically impelling mechanisms is substantially rectangular, that is to say, the frame is advanced by the rack bars 181 and 182 carrying the tobacco strips or sheet, then is elevated by the plates 209 and 210 out of engagement with the strips; next retreats horizontally, and then downwardly pressing and engaging the strips preparatory to another advance.

The advanced strips are forced by the frame 200 into a receiving box that will be later described and the varying density of the mass of strips fed thereto by the frame in its successive reciprocation would, unless provided for, pack the receiving box with bunches of varying and excessive density, which would render the final bunch unmerchantable. This obstacle is overcome thus. When the resistance of the strips to the front of the prongs 246 in the advance of the latter reaches a predetermined degree, the frame 238 yields rearwardly with relation to the frame 200 against the tension of the springs 252, thereby, through the screws 260, outwardly expanding the arms 254 so that their points lock into the teeth 262 and 263, thus preventing any further advance of either frame. When the frames have risen and begin their retreat the arms 254 withdraw under the action of the springs 252. When it is desired to form bunches of another degree of density the nuts 250 are adjusted on their screws thereby changing the tension on the springs 252.

It will be noted that the sudden engagement of the points 257 with the teeth 262, 263 before the end of the advance of the rack bars, interrupts the travel of the latter and would produce a breakage unless some means be provided for releasing the driving mechanism. This means is best shown in Figs. 9, 10 and 11. The segments 186 and 187 are both initially driven by a segment 266 fixed to the sleeve 62 and located adjacent the toothed segment 187. This is provided with a cam shoulder 268 upon its periphery. Extending forwardly and outwardly from the front edge of the segment 266 is a boss 269 in which is pivoted a stud 270 provided with a square head 271 provided with a transverse hole 272. The stud is held in its bearing by a pin 273 and washer 274. The boss 269 normally rests against the forward edge of the segment 187 and a segment 276 loosely mounted on the hub 277 of the segment 187. The periphery of the segment 276 is provided with a shoulder 278. Upon the outer face of the segment 187 is a pin 279 to which is pivoted a latch 280 having a hook 281 adapted to engage the shoulder 278 when the several segments are in normal position. Upon the inner face of the latch is a stud 283 passing through a slot 284 in the segment 187 and normally resting upon the periphery of the segment 266 in front of the shoulder 268. Pivotally mounted in the margin of the segment 276 is a stud 287 having a squared head 288 provided with a transverse hole 289. Passing through the holes 272 and 289 is a pin 290 provided at one end with a thread 291 to accommodate a nut 292 bearing against the stud head 271. Upon its other end is an annular shoulder 293 against which abuts one end of a spring 294 whose other end presses against the stud head 288. A collar 296 fixed to the hub 277 holds the segment 276 against the outer face of the segment 187.

Before the points 257 engage their teeth the described segments rotate forwardly together in the same relative positions as shown in Fig. 10. After the points 257 have locked the segments assume the relation shown in Fig. 11, namely the stoppage of the rack bar 181 and 182 checks the advance of the segments 186 and 187 and 276, but the segment 266 continues its advance, lifting, by its shoulder 268 and stud 283, the latch 280 out of engagement with the shoulder 278, thereby releasing the segments 266 and 276 and permitting them to advance under the pressure of the spring 294. Thus the racks, and toothed segments which are connected to the rock shaft 63, remain at rest temporarily released from all connection with the driving mechanism.

Fixed to each side margin of the bed in advance of the reciprocating frames are the supports 298 of a flat transverse bar 299 carrying a series of horizontal bars 300 adapted to register intermediate the fingers 245 when the frames advance, and since the horizontal bars are spaced from the bed they serve to insure an even surface to the sheet of strips as they are being advanced to the receiving box.

The forward end of the machine frame comprises uprights 24 fixed to the floor 20 carrying the mechanism for supporting the box into which the strips are fed and by which they are sized. This mechanism includes the receiving box 304, having open front and rear ends, with its base in alinement with the forward end of the bed. The box has trunnions 307 upon its sides at its rear end journaled in the uprights 24. In the box are guides 309 which extend rearwardly therefrom. Slidably mounted upon the bottom of the box between the guides is a plunger 311 having upon its forward end a vertical rectangular plate 312 which extends to the top of the box and forms the back of a receiving chamber 313. Upon the rear of the plunger is a vertical lug 315 provided with a threaded opening 316 to receive a screw 317. In the box is a slide 319 in the form of a frame comprising sides 320 slidable on the sides of the plunger, and having a cross piece 321 at its forward end upon the top of the plunger. At an intermediate portion of the sides is a second cross piece or bar 323, provided with an opening 324. Lateral shoulders 325 upon the forward end of the sides 320 are adapted to form stops for the slide in its rearward travel. The plunger plate 312 is adjustable to vary the capacity of chamber 313 by means of the screw 317 which is turned by a knurled nut 327 fixed to the screw and abutting against one side of 323. A shoulder 328 on the end of the screw holds the latter in engagement with the bar 323. On a pin 330 in the rear ends of the sides 320 is a roller 331.

The receiving box is axially reciprocated from a horizontal position to the downwardly inclined position shown in broken lines in Fig. 7 by the following mechanism. Upon one of the trunnions 307, exterior of the frame, is fixed an arm 333 to whose end is pivoted a connecting rod 334 upon whose end is a fork 335 which embraces the cam shaft 30, and which carries a cam roll 337 traveling in a channel 338 of a cam plate 339, as shown in Fig. 21. The cam plate is fixed to the wheel 340. The fork is held against the cam by a disk 342 fixed to the cam shaft. Before the box is downwardly tilted by the described mechanism it has been filled to its capacity from the pieces of filler advanced by the frames. After the box has been filled and before its descent the advancing filler material is cut and the box closed by the descent of a knife 344 fixed to two vertical racks 346 which engage toothed segments 348 fixed to a rock shaft 349 mounted in the uprights 24, and upon whose end is fixed an arm 351 to which is pivoted rod 353 connected to an arm 354 fixed to rock shaft 222. Thus a reciprocating motion is imparted to the knife. The knife edge coöperates with a cutter plate 356 fixed in the forward end of the bed. The knife and racks are guided in their vertical travel by a transverse guide rod 358 journaled in the uprights in front of the knife and provided with annular shoulders 359 overlapping the ends of the knife. A second guide rod 361 is located behind the knife and is provided with shoulders 362 embracing the edges of the knife. This rod is journaled in blocks 363 slidably mounted in horizontal slots 365 in the uprights 24. The blocks are adjustable in the slots by adjusting screws 367 fixed to the blocks and operated by nuts 368 thereon. By virtue of this horizontal adjustment the rod 361 will keep the knife 344 in close contact with the cross bar 299 and in proper relation to the cutter plate 356.

In order to prevent the premature escape of the filler from the box in its descent a shield 370 is fixed to the frame below the bed.

The mechanism for discharging the contents of the receiving box is as follows. In the path of travel of the roller 331 above the horizontal position of the box is a hook 372 upon a plate 373 slidable in guides 375 in an inclined cross bar 376 fixed at its ends to the uprights. The plate 373 is reciprocated thus. A lug 377 has pivoted thereto a link 379 connected with the end of an arm 381 fixed to a rock shaft 383 journaled in the uprights. Upon one end of this shaft is fixed an arm 385. Pivoted to its end is a connecting rod 386 having on its end a fork 387 embracing the cam shaft 30. A cam roller 389 on the fork travels, as shown in Fig. 22, in a cam channel 390 in a cam plate 391 fixed to the face of the wheel 240. The fork 387 is held in contact with the cam 391 by a disk 393 fixed to the shaft. The mechanism is so timed that when the roller 331 in its upward travel engages the hook 372 the latter descends and pushes downwardly the slide 319 and its plunger 311 thus discharging the contents from the box chamber 313.

The mechanism for applying the binder to the bunch or charge discharged from the box is as follows. A convex rolling table 395 is pivoted at its outer end, through lugs 396 upon its bottom, upon a rod 398 fixed in the machine side frames 22. The table is yieldingly supported by curved flat springs 399 fixed to the frame below the table and contacting therewith at its inner end.

The rolling apron 400 has one end clamped to the outer end of the table by a clamping plate 402, and, after passing over and beyond the table, and over a guide roll 404, in the frame is fixed at its other end to a rod 406 fast in the arms 407 fixed to a rock shaft 408 mounted in the sides of the machine frame. Fixed to the shaft 408 are depending arms 409 and 410. A roller 411 on a pin 412 in the arm 410 engages the faces of cams 413 and 414.

The roller 411 is held in contact with cam 413 by a spring 415 attached to the frame and to arm 410. Cam 413 is fixed to a rock shaft 416 mounted in the frame to which is fixed an arm 417 pivoted to a rod 418 having upon its lower portion a fork 419 embracing the cam shaft 30 and carrying a roller 421 traveling, as shown in Fig. 18, in the channel 422 of a cam plate 423 fixed to the face of the wheel 234. The fork is held in contact with the cam by a disk 426 fixed to the cam shaft. The cam shaft through the described connections reciprocates the bar 406 whereby the apron is alternately gradually tightened and slackened, the movements being so timed that a maximum of slack is afforded at the time the receiving box discharges its contents.

The cam 414 has an operating face 428 upon its side edge. It is pivoted at one end by a pin 429 to the cam 413, and is provided near its other end with a segmental slot 430 to admit a bolt 432 in the cam 413 by which means the cam surface 428 is adjustable to take up the slack in the apron during the bunch rolling operation.

It will be understood that the operator manually places the binding sheet of tobacco 433 upon the portion of the apron above the table 395.

434 is a bunch roller on a rod 435 fast in the upper ends of arms 437 fast at their lower ends to the rock shaft 416, by which the roller 434 is vibrated. This roller in its rearward position contacts with the back of the receiving pocket 439 formed in the apron below the receiving box by the slack in the apron. As the roller advances it entirely incloses the bunch within the pocket, and advances the resultant fold over the table 395, in a rolling operation, as shown in broken lines in Fig. 7; the slack of the apron being taken up during this operation by cam 414 operating through the arms 407. After the roller passes the front of the table in its travel, as shown in broken lines in said figure, the rod 406 takes up the final slack and imparts a quick impulse to the apron to insure the complete disengagement of the bunch, by means of an arm 441 fast to shaft 416, which arm in its advane strikes a stud 443 mounted in the arm 409 fixed to rock shaft 408.

What I claim is,—

1. In a machine of the type set forth, the combination of an abutment, spaced blades upon the abutment, means for pressing the tobacco strip against the blades, and means movable independently of said pressing means and between said blades and coöperating with the pressing means for carrying said strip after the engagement of the strip with the blades.

2. In a machine of the type set forth, the combination of an abutment, spaced blades upon the abutment, plungers movable into contact with the blades, and a plunger intermediate the first mentioned plungers movable between the blades.

3. In a machine of the type set forth, the combination of an abutment, spaced blades upon the abutment, reciprocating plungers movable in unison into contact with the blades, and a plunger intermediate the first mentioned plungers movable between and beyond the knives.

4. In a machine of the type set forth, the combination of an abutment, spaced blades upon the abutment, two reciprocating plungers movable in unison toward and away from the blades, means for reciprocating the plungers, and a third reciprocating plunger intermediate the first mentioned plungers movable beyond the same and between the blades, and means for operating the third plunger.

5. In a machine of the type set forth, the combination of an abutment, reciprocating plungers movable in unison toward and from the abutment, spaced blades upon the abutment in the path of the plungers and adjustable toward each other, a reciprocating plunger intermediate the first mentioned plungers and movable between the blades, and means for operating the plungers.

6. In a machine of the type set forth, the combination of an abutment, blades upon the abutment spaced from each other and projecting from said abutment, means for forcing the tobacco strip against the ends of the blades, and means movable for a portion of its travel with said first-named means and for the remainder of its travel movable independently and between said blades to finally sever the strips left uncut by the blades.

7. In a machine of the type set forth, the combination of an abutment, spaced blades upon the abutment projecting in front of the abutment, reciprocating plungers movable to and from the ends of the blades, reciprocating stripper plates movable along the sides of the blades, and means actuating the plates for operating the plungers.

8. In a machine of the type set forth, the combination of an abutment, spaced blades upon the abutment provided with semi-elliptical faces, two reciprocating plungers movable to and from the blades, a third reciprocating plunger between the two plungers having an elliptical face adapted to slide in contact with the semi-elliptical faces of the blades, and means for actuating the plungers.

9. In a machine of the type set forth, the combination of a bed, an abutment on the bed, screws on the abutment, knives comprising bases and blades, said bases being provided with slots to receive the screws, plates slidably mounted on the bed, stripper plates adjustably mounted on the plates adjacent the knives, and means for sliding the plates.

10. In a machine of the type set forth, the combination of a bed, an abutment on the bed, blades on the abutment, reciprocating plungers on the bed, movable toward and from the blades and normally spaced from the blades to form a receiving compartment, reciprocating stripper plates movable along the sides of the blades, means for operating the plungers, and means for closing the compartment before the advance of the plungers.

11. In a machine of the type set forth, the combination of a bed, an abutment on the bed, blades on the abutment, plungers on the bed spaced from the abutment and forming a receiving compartment, reciprocating stripper plates movable along the sides of the blades, and means for closing the compartment.

12. In a machine of the type set forth, the combination of a bed, an abutment on the bed, blades on the abutment, reciprocating plungers slidably mounted on the bed movable to and from the blades and spaced from the abutment to form a receiving compartment, reciprocating stripper plates movable along the sides of the blades, means for reciprocating the plungers, a vibratory cover supported by the abutment and movable to open and close the compartment, and means for vibrating the cover actuating the reciprocating means.

13. In a machine of the type set forth, the combination of a bed, an abutment on the bed, blades on the abutment, reciprocating plungers slidably mounted on the bed to coöperate with the blades and spaced from the abutment to form a receiving compartment, reciprocating stripper plates movable along the sides of the blades, a rock shaft on the abutment, and a cover fixed to the shaft and extending over the compartment.

14. In a machine of the type set forth, the combination of a bed, an abutment on the bed, a compartment on the bed adjacent the abutment, a rock shaft mounted on the abutment, a cover extending over the compartment fast to the rock shaft, resilient means on the bed operatively connected with the rock shaft for rocking the shaft in one direction, an arm fixed to the rock shaft, and means for elevating the arm to rock the shaft in the opposite direction.

15. In a machine of the type set forth, the combination of a bed, an abutment on the bed, a compartment on the bed adjacent the abutment, a cover extending over the compartment fast to the rock shaft, forks upon the rock shaft, plates slidably mounted on the bed, studs on the plates engaged by the forks, springs attached to the bed engaging the plates, an arm fixed to the rock shaft, and means for elevating the arm.

16. In a machine of the type set forth, the combination with the frame of a bed on the frame, an abutment on the bed, a compartment on the bed adjacent the abutment, a rock shaft on the abutment, a cover extending over the compartment fast to the rock shaft, forks on the shaft, plates slidably mounted on the bed, studs on the plates engaged by the forks, springs attached to the bed, engaging the plates, a downwardly inclined cam arm fixed to the rock shaft, a shaft in the frame below the cam arm, a lever on the shaft, a roll on the lever engaging the cam arm, an arm on the shaft, a rod connected to the upper end of the arm, and a pedal upon the lower end of the arm.

17. In a machine of the type set forth, the combination of a frame, a bed on the frame, an abutment on the bed, blades on the abutment, reciprocating plungers upon the bed spaced from the abutment forming a compartment and movable to and from the blades, a rock shaft mounted on the abutment, a cover fast to the rock shaft extending over the compartment, an arm on the shaft, a power shaft in the frame, a main shaft in the frame, operative connections between the main shaft and plungers, a clutch mechanism connecting the power shaft and main shaft, and means actuating the rock shaft arm for operating the clutch mechanism.

18. In a machine of the type set forth, the combination of a frame, a bed on the frame, an abutment on the frame, blades on the abutment, reciprocating plungers on the bed spaced from the abutment to form a compartment, a rock shaft on the abutment, a cover fast to the rock shaft overhanging the compartment, a cam arm on the rock shaft, a shaft in the frame below the rock shaft, a lever on the second shaft engaging the cam arm, an arm on the second shaft, a vibratory rod pivotally connected to the second arm, means for reciprocating the rod, a pin in the rod, a main shaft mounted in the frame, an arm loosely mounted on the main shaft engaged by the pin, a disk loose on the main shaft provided with notches, a pawl on the arm adapted to engage the notches, a second disk loose on said shaft and attached to the first disk and provided with an opening, a cam tooth on the side of the second disk, a third disk fast to the main shaft, a pin in the third disk entering the opening in the second disk, a gear fast on the main shaft, a second rock shaft in the frame, an arm on the said shaft engaging the cam tooth, a fork fast to the second rock shaft, a clutch sleeve engaged by the fork, a power shaft in the frame upon which the clutch sleeve is slidably mounted, a collar on the power shaft, a spring on said shaft in contact with the sleeve and collar, teeth on the sleeve, a clutch member loose on the power shaft, teeth on the clutch member adapted to engage the teeth on the sleeve, a pinion on the clutch member engaging the gear, and operative connections between the main shaft and the plungers.

19. In a machine of the type set forth, the combination of a frame, a bed on the frame, an abutment on the bed, blades on the abutment, reciprocating plungers slidably mounted on the bed movable to and from the blades and spaced from the abutment forming a receiving compartment, a rock shaft mounted on the abutment, a cover fast to the rock shaft extending over the compartment, an arm on the rock shaft, a power shaft in the frame, operative connections between the main shaft and the plungers, a clutch mechanism connecting the power shaft and the main shaft, and means for actuating the rock shaft arm prior to setting in operation the clutch mechanism.

20. In a machine of the type set forth, the combination with the frame, a horizontally reciprocating carrier frame supported by the frame above the bed and provided with teeth upon its bottom face, means for reciprocating said frame, a second frame slidably mounted in the carrier frame, forwardly extending fingers on the second frame, prongs on the fingers, and resilient means connecting the carrier frame and second frame for forwardly pressing the fingers.

21. In a machine of the type set forth, the combination with a bed and receiving box, of a reciprocating carrier frame adapted to advance tobacco strips to the box, means for reciprocating the frame, a second frame slidably mounted in the carrier frame, fingers on the second frame, resilient means connecting the carrier frame and second frame for pressing said fingers, and means adjustable to vary the capacity of the box for preventing excessive density in the completed bunch.

22. In a machine of the type set forth, the combination with the frame, of a bed on the frame, reciprocating bars on the frame beside the bed, means for actuating the bars, journal plates on the bars, plates slidably mounted on the frame provided with teeth, a carrier frame mounted in the journal plates and slidable plates above the bed, teeth on the bottom of the carrier frame, a second frame slidably mounted in the carrier frame, fingers in the second frame, prongs on the fingers, springs connecting the carrier frame and the second frame, laterally inclined arms pivotally connected at their rear ends to the carrier frame, provided with points upon their opposite ends to engage the teeth on the slidable plates, and provided with longitudinal slots, and members fixed to the second frame registering in the slots.

23. In a machine of the type set forth, the combination with the frame and bed, of plates slidably mounted in the frame beside the bed, teeth on the plates, a carrier frame mounted in the plates, a second frame slidably mounted in the carrier frame, lugs on the rear of the second frame, adjusting screws mounted in the lugs, springs connecting the screws with the forward portion of the carrier frame, laterally inclined arms pivotally connected with the rear portion of the carrier frame and provided with points on their free ends adapted to engage the teeth on the plates, and provided with longitudinal slots, and members fixed in the second frame registering in the slots.

24. In a machine of the type set forth, the combination with the bed, of a receiving box at the end of the bed, a reciprocating carrier frame above the bed and movable toward the box to advance tobacco strips along the bed toward the box, means for reciprocating the carrier frame, a second frame yieldingly mounted in the carrier frame adapted to advance the strips from the carrier frame to the box, and means for regulating the degree of pressure of the second frame upon the strips.

25. In a machine of the type set forth, the combination with the frame and bed, of reciprocating rack bars in the frame beside the bed, journal plates on the rack bars, plates mounted on the frame beside the bed, teeth on the second mentioned plates, a carrier frame mounted in the journal plates, a second frame slidably mounted in the carrier frame, springs connecting the two frames, vibratory arms pivoted to the carrier frame provided with points adapted to engage the teeth, and means for taking up the motion of the rack bars after the engagement of the arms with the teeth.

26. In a machine of the type set forth, the combination with the frame and bed, of reciprocating rack bars in the frame beside the bed, a rock shaft mounted in the frame, a sleeve loose on the rock shaft, means for rocking the sleeve, segments fast on the rock shaft, teeth on the segments engaging the racks, a driving segment fast to the sleeve and normally engaging one of the toothed segments, a segment loose on the shaft normally engaged by the driving segment, journal plates on the rack bars, plates on the frame, teeth on the second mentioned plates, a carrier frame mounted in the journal plates, a second frame slidably mounted in the carrier frame, springs connecting the frames, arms pivoted to the carrier adapted to engage the teeth on the plates, and means for releasing the driving segment from the other segments when the arms engage the teeth upon the plate.

27. In a machine of the type set forth, the combination of the frame, rack bars, and frames carried by the rack bars, of a rock shaft mounted in the frame, a sleeve loose on the shaft, means for rocking the sleeve, segments fast on the shaft, having teeth engaging the racks, one of said segments being provided with a slot, a latch on said segment, a stud on the latch extending through the slot, a driving segment fast on the sleeve provided with a peripheral shoulder adapted to engage the stud, a boss on the driving segment, a second stud pivotally mounted in the boss, a head on the said stud provided with a hole, a pin, a nut on one end of the pin, a shoulder on the other end of one of said studs, and a spring on the pin having one end abutting against the shoulder and its other end abutting against one of the studs.

28. In a machine of the type set forth, the combination with the frame, of a bed on the frame, reciprocating bars slidably mounted on the frame beside the bed, means for actuating the bars, plates on the bars, a horizontal carrier frame attached to the plates above the bed provided with teeth on its lower face, a second frame yieldingly mounted in the carrier frame, forwardly extending fingers upon the second frame, supports on the frame beside the bed, a transverse bar upon the supports above the bed, and a series of horizontal bars upon the transverse bar adapted to register between the fingers.

29. In a machine of the type set forth, the combination with the machine frame, of a rolling table yieldingly mounted upon the machine frame, an apron on the table, a rock shaft in the frame, a bunch-roller frame upon the shaft, a bunch roller upon the second frame, mounted for vibration and engaging the apron, means for imparting a quick impulse to the apron to insure complete disengagement of the bunch, and means for rocking the shaft.

30. In a machine of the type set forth, the combination with the frame, of a rolling table yieldingly mounted at one end to the frame, an apron on the table, a rock shaft in the frame, a frame on the shaft, a bunch roller on the second frame in contact with the apron adjacent the free end of the table, means for imparting a quick impulse to the apron to insure complete disengagement of the bunch, and means actuating the rock shaft and vibrating said roller.

31. In a machine of the type set forth, the combination with the frame, of a rod fixed in the front of the frame, a convex rolling table pivotally mounted at its front end to the rod, a spring upon the frame in contact with the bottom of the table, an apron upon the table, a bunch roller in contact with the apron, means for advancing the roller to depress the free end of the table, and means for imparting a quick impulse to the apron to insure complete disengagement of the bunch.

32. In a machine of the type set forth, the combination with the frame, of a rolling table yieldingly mounted at one end to the frame, a vibratory frame mounted in the frame, an apron fast to the table and engaging the vibratory frame, a rock shaft in the frame, a roller frame on the shaft, a bunch roller on the roller frame in contact with the apron, means actuating the rock shaft for vibrating the vibratory frame, and means for imparting a quick impulse to the apron to insure complete disengagement of the bunch.

33. In a machine of the type set forth, the combination of a yielding rolling table, a yielding frame adjacent the table, an apron fixed at its ends to the table and frame to form an intermediate bight, a bunch roller movable in contact with the apron at the bight, means for moving the frame as the roll advances, and means for imparting a quick impulse to the apron to insure complete disengagement of the bunch.

34. In a machine of the type set forth, the combination with the frame, of a rolling table on the frame, a slack apron on the table, means for rolling the slack of the apron over the table, means coöperating with the rolling means for taking up the slack during the rolling operation, and means for imparting a quick impulse to the apron to insure complete disengagement of the bunch.

35. In a machine of the type set forth, the combination with the frame, of a rolling table yieldingly mounted on the frame, a rock shaft in the frame, a vibratory frame on the rock shaft, an apron connecting the vibratory frame and the table, a second rock shaft in the frame, a roller frame fixed to the second shaft, a roller on the roller frame engaging the apron, a cam on the second shaft, and an arm on the first shaft in contact with the cam.

36. In a machine of the type set forth, the combination with the frame, of a rolling table yieldingly mounted on the frame, a rock shaft in the frame, a vibratory frame on the shaft, an apron connecting the vibratory frame and the table, a second rock shaft in the frame, a roller frame engaging the apron, a cam on the second shaft, and a second cam attached to the first cam adjustable with relation thereto.

37. In a machine of the type set forth, the combination with the frame, of a rolling table on the frame, a slack apron on the table, means rolling the slack apron over and beyond the table, and means coöperating with and actuated by the rolling means for taking up the slack after the rolling means has operated beyond the table.

38. In a machine of the type set forth, the combination with the frame, of a rolling table mounted at one end on the frame, a vibratory frame mounted in the frame, an apron provided with slack fast to the vibratory frame and to the end of the table, means for actuating the vibratory frame, a vibratory roller frame mounted in the first frame, a bunch roller on the roller frame movable over the apron and beyond the table, and means actuated by the roller frame actuating means for taking up the slack after the bunch roller has moved beyond the table.

39. In a machine of the type set forth, the combination with the frame, of a rolling table on the frame, a rock shaft in the frame, a vibratory frame on the rock shaft, an apron connecting the vibratory frame and table, a second rock shaft in the frame, a roller frame on the second rock shaft, a bunch roller on the roller frame engaging the apron, two arms on the first shaft, an arm on the second shaft adapted to engage one of said arms, and a cam on the second shaft adapted to engage the other of said arms.

40. In a machine of the type set forth, the combination with the bed and receiving box, of blades mounted upon the bed, reciprocating plungers mounted upon the bed movable to and from the blades, a plunger intermediate the first-mentioned plungers movable between and beyond the blades, a reciprocating carrier frame slidably mounted and movable to and fro between the blades and the box, and means actuating the carrier for reciprocating the plungers.

In testimony whereof I have affixed my signature in presence of two witnesses.

ALLEN J. COLWELL.

Witnesses:
 HORATIO E. BELLOWS,
 CHARLES S. JENCKES.